(12) United States Patent
Parker

(10) Patent No.: US 12,005,512 B1
(45) Date of Patent: Jun. 11, 2024

(54) TURNING SYSTEM AND METHOD OF USE

(71) Applicant: Vincent Parker, Porter, TX (US)

(72) Inventor: Vincent Parker, Porter, TX (US)

( * ) Notice: Subject to any disclaimer, the term of this patent is extended or adjusted under 35 U.S.C. 154(b) by 191 days.

(21) Appl. No.: 16/988,007

(22) Filed: Aug. 7, 2020

(51) Int. Cl.
*B23B 3/06* (2006.01)
*B23Q 1/54* (2006.01)
*B23Q 3/152* (2006.01)

(52) U.S. Cl.
CPC ............. *B23B 3/06* (2013.01); *B23Q 1/5406* (2013.01); *B23Q 3/152* (2013.01)

(58) Field of Classification Search
CPC ...... B23Q 1/5406; B23Q 1/5412; B23Q 1/70; B23Q 1/703; B23Q 3/152; B23B 23/045; B23B 3/06; B23B 45/003
See application file for complete search history.

(56) References Cited

U.S. PATENT DOCUMENTS

| | | | | |
|---|---|---|---|---|
| 3,973,784 A * | 8/1976 | Smith | ................... | B25B 21/007 7/165 |
| 4,819,923 A * | 4/1989 | Zumbusch | ........... | B23Q 1/5406 269/71 |
| 5,174,586 A * | 12/1992 | Saeda | ................... | B23Q 1/5437 74/813 L |
| 5,224,691 A * | 7/1993 | Clark | ........................ | B25B 5/10 411/436 |
| 5,921,562 A * | 7/1999 | Robison | ................... | B23B 31/28 81/439 |
| 6,056,339 A * | 5/2000 | Berger | ................... | B25B 11/002 294/65.5 |
| 7,104,169 B2 * | 9/2006 | Inada | ..................... | B23Q 1/017 82/149 |
| 7,281,306 B2 * | 10/2007 | Ueda | ....................... | B23B 3/168 29/27 R |
| 7,354,230 B2 * | 4/2008 | Bauman | ................ | B23B 31/008 403/379.5 |
| 7,435,042 B2 * | 10/2008 | White | ................... | B23B 45/005 408/127 |
| 7,631,407 B2 * | 12/2009 | Feinauer | ................... | B23B 3/30 29/27 R |
| 8,172,234 B2 * | 5/2012 | Bernhardt | ............... | B23B 31/20 269/69 |

(Continued)

FOREIGN PATENT DOCUMENTS

CH 243520 A * 7/1946
DE 3151613 A1 * 8/1982

(Continued)

OTHER PUBLICATIONS

Description DE3738110A1 (translation) obtained at https://worldwide.espacenet.com/ (last visited May 20, 2022).*

(Continued)

*Primary Examiner* — Ryan Rufo
(74) *Attorney, Agent, or Firm* — Richard Eldredge; Leavitt Eldredge Law Firm

(57) ABSTRACT

A turning system allows for slow revolution of a shaft at variable angles so that the work pieces such as cup can be operated on. The work piece could be attached by a hollow cylinder that magnetically attaches to the shaft of the system by placing the hollow cylinder on the shaft. As the shaft enter it contacts an attachment device such as a magnet to hold the work piece on the shaft.

1 Claim, 6 Drawing Sheets

(56) References Cited

U.S. PATENT DOCUMENTS

| | | | |
|---|---|---|---|
| 8,393,836 B2 * | 3/2013 | Wang | B23Q 15/22 409/16 |
| 8,549,964 B2 * | 10/2013 | Fujimoto | B23Q 39/048 82/124 |
| 11,065,744 B2 * | 7/2021 | Zimmermann | B25B 23/0035 |
| 11,123,847 B2 * | 9/2021 | Huang | B25B 13/06 |
| 2005/0198793 A1 * | 9/2005 | Ueda | B23B 3/168 29/27 C |
| 2007/0127994 A1 * | 6/2007 | Welker | B23B 51/126 408/226 |
| 2007/0182109 A1 * | 8/2007 | Considine | B23B 31/28 279/128 |
| 2007/0234541 A1 * | 10/2007 | Feinauer | B23Q 39/024 483/23 |
| 2015/0224616 A1 * | 8/2015 | Miquel | B23C 3/16 409/174 |
| 2017/0348847 A1 * | 12/2017 | Dembeck | B25F 3/00 |
| 2018/0245706 A1 * | 8/2018 | Hu | B25B 23/12 |
| 2021/0252608 A1 * | 8/2021 | Ruschitzka | B24B 41/061 |
| 2023/0219203 A1 * | 7/2023 | Blay | A61B 17/8875 81/125 |

FOREIGN PATENT DOCUMENTS

| | | | | |
|---|---|---|---|---|
| DE | 3738110 A1 | * | 5/1989 | |
| DE | 102017122536 A1 | * | 9/2018 | |
| FR | 1084235 A | * | 1/1955 | |
| GB | 2463346 A | * | 3/2010 | B23B 51/02 |
| TW | 1362312 B | * | 4/2012 | |

OTHER PUBLICATIONS

Description DE102017122536A1 (translation) obtained at https://worldwide.espacenet.com/ (last visited Aug. 17, 2022).*

* cited by examiner

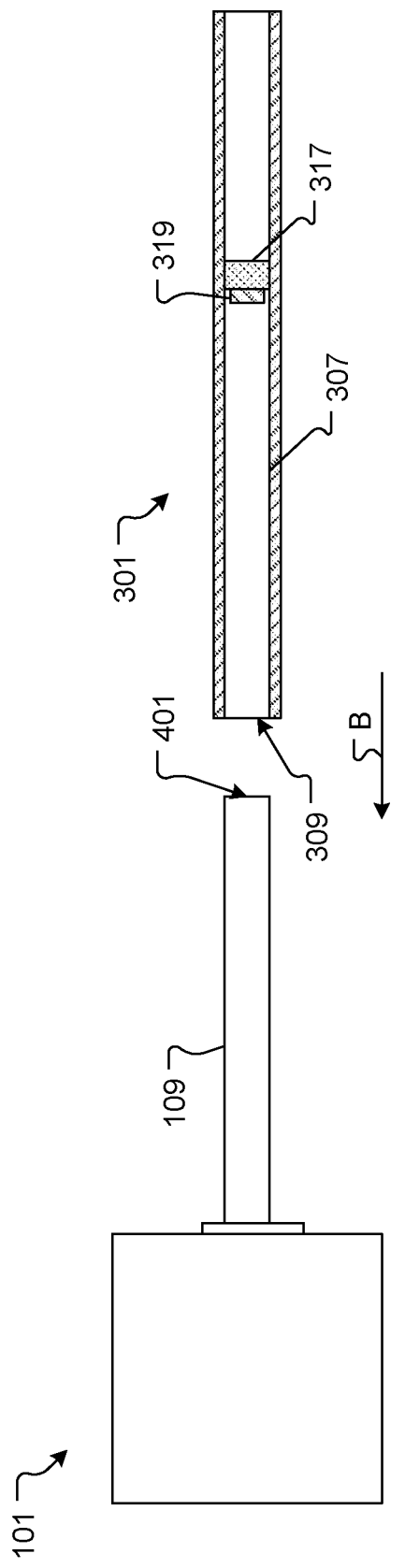
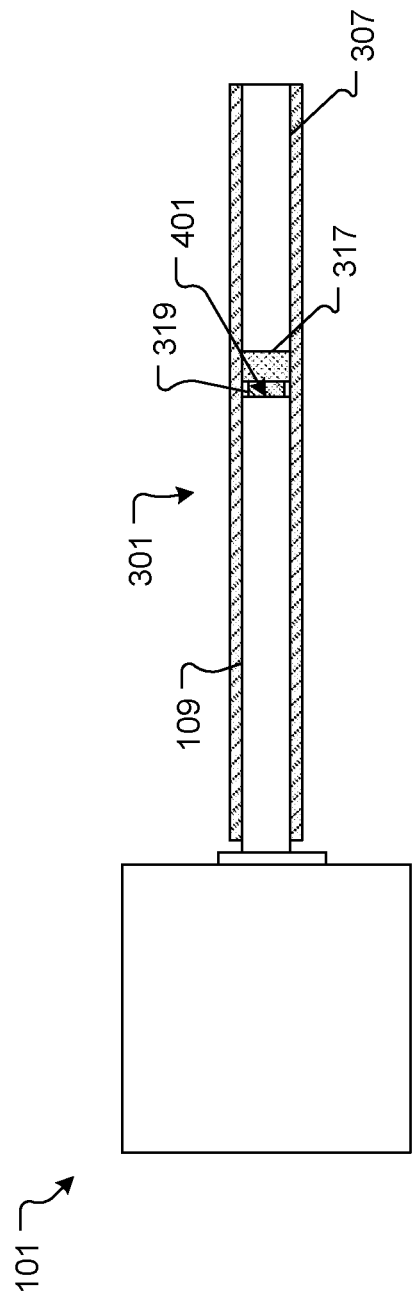

TURNING SYSTEM AND METHOD OF USE

BACKGROUND

1. Field of the Invention

The present invention relates generally to machining systems and methods, and more specifically, to a turning system that enables a rotating shaft to be rotated to alter the position of the workpiece so that machining and finishing work is more efficiently performed thereon.

2. Description of Related Art

Machining systems are well known in the art and are effective means to remove material from a workpiece through the rotation or reciprocation of a tool. Common, machining processes included milling, drilling, sawing, and turning. For example, the process of turning commonly has a rotating workpiece that is held in a vice and then moved against a stationary tool. The tool, cuts or removes material from the workpiece surfaces is a rotational or radial pattern. Commonly, objects that have a uniform circular cross-section are produced in this way. Commonly, the rotating workpiece is secured in a position relative to the tool.

One of the problems commonly associated with common machining and turning systems is their limited use. For example, if manual work is to be performed on the rotating workpiece the person must awkwardly apply the tool while leaning over or above the workpiece.

Additionally, the workpiece rotates hundreds if not thousands of times per minute, and any unintentional or accidental contact with the piece at these speeds can cause injury or damage. Leaning or working over the piece increases the risk of accidental contact and injury.

Accordingly, although great strides have been made in the area of machining and turning systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 4A and 4B are cross-sectional side views of the embodiment of FIG. 3; and

Figure 1A:
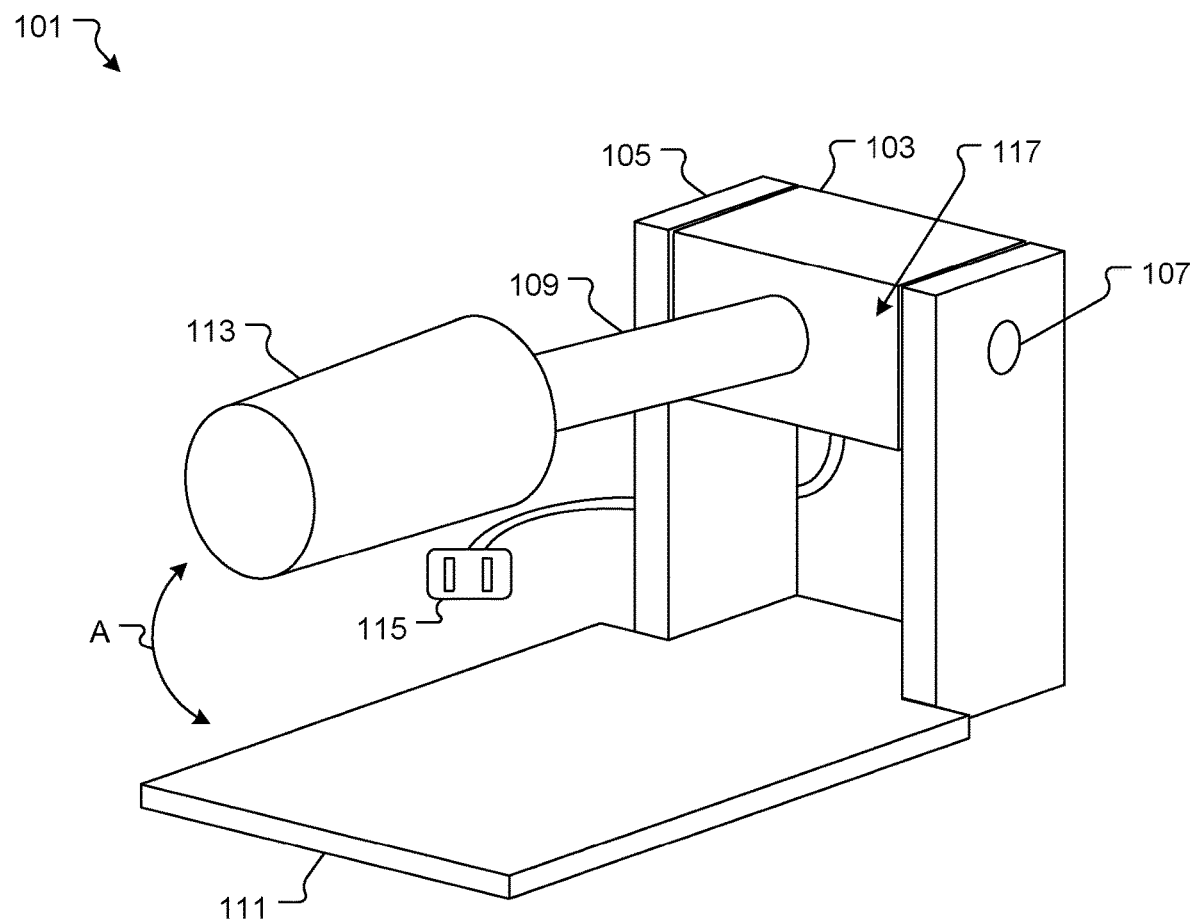
FIGS. 1A and 1B are front isometric views of a turning system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with conventional machining and turning systems. Specifically, the present invention provides the means to alter the position of a rotating workpiece to accommodate the needs of the person working thereon. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
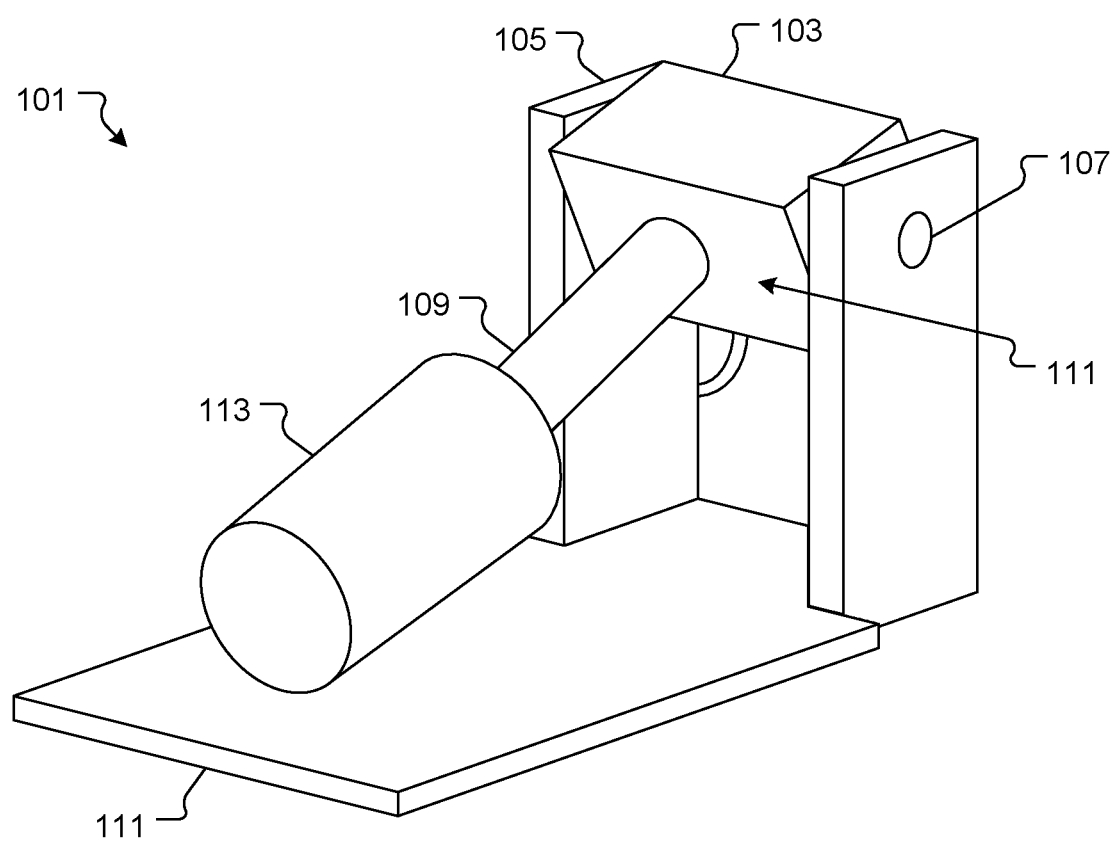

Referring now to the drawings wherein like reference characters identify corresponding or similar elements throughout the several views, FIGS. 1A and 1B depict front isometric views of a turning system in accordance with a preferred embodiment of the present application. It will be appreciated that system 101 overcomes one or more of the above-listed problems commonly associated with conventional machining and turning systems.

In the contemplated embodiment, system 101 includes a turning head 103 rotationally attached to supports 105 via axis 107. The supports 105 are attached to a base 111. The base 111 is configured to stabilize the turning head 103 and catch any ships, material or by-products from the work there above. The turning head 103 includes a shaft 109 extending from the front surface 117. The shaft 109 is configured to hold a cup 113 or another workpiece thereon. The turning head 103 also includes a power source 115 that provides the motive force to rotate the shaft 109.

Figure 2:
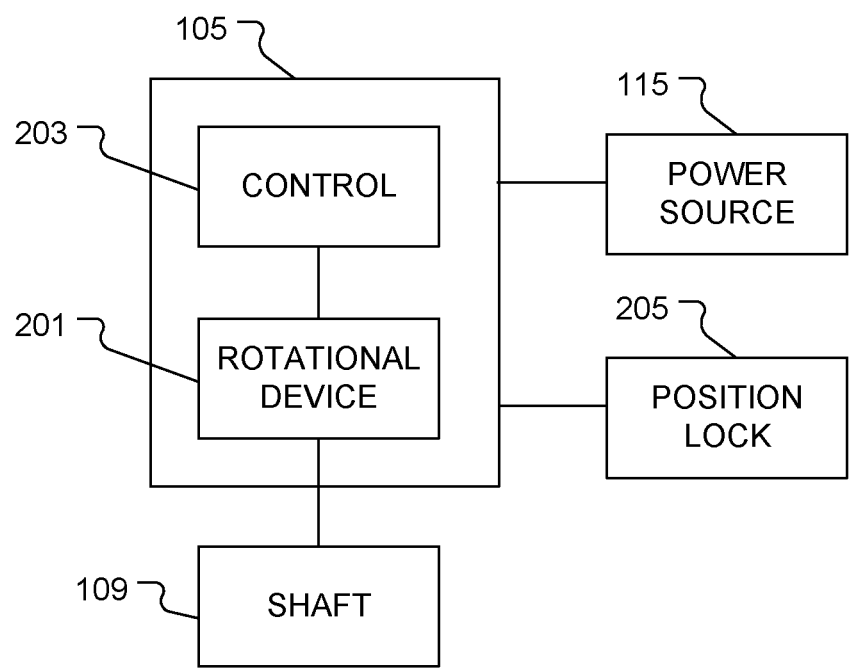
FIG. 2 is a schematic of the turning head of FIGS. 1A and 1B.

The turning head 103 is further depicted by FIG. 2 and includes a control 203 in communication with a rotational device 201 that alters the speed of rotation of the shaft 109. A position lock 205 secures the turning head 103 in relation to the supports 105 and base 111.

In use, a cup 113 is attached to the shaft 109 and the turning head 103 is pivoted as depicted by motion A, and then held in place by the position lock 205. The rotational device 201 is activated and a person then modifies the cup while it rotates.

Figure 3:
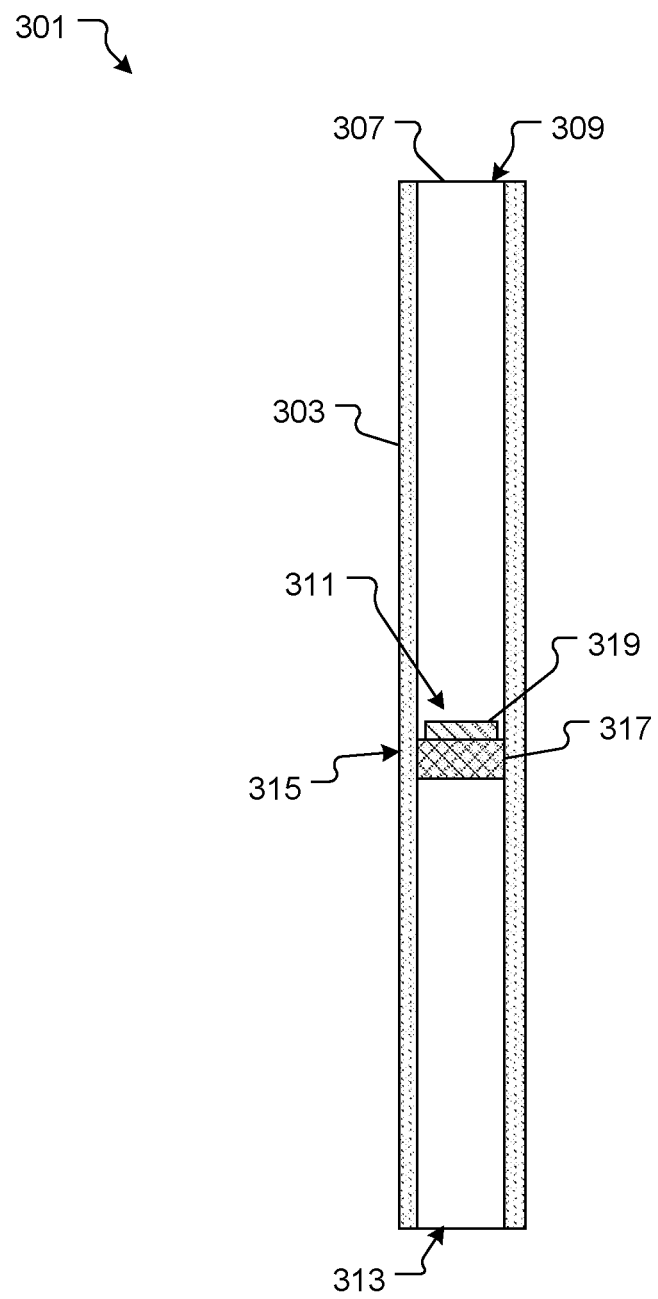
FIG. 3 is a cross-sectional side view of the shaft of FIGS. 1A and 1B.

Referring now to FIG. 3 the preferred embodiment of the system 101 is depicted. embodiment 301 includes a hollow cylinder 303 open at a first end 313 and at a second end 309 and is configured to conform to the shaft 109 of system 101 with a passageway 307 therebetween. The hollow cylinder 303 includes an attachment device 311 in the passageway 307 near the mid-point 315 thereof. The attachment device 311 is configured to attach the hollow cylinder 303 to the shaft 109.

It is contemplated that many cups 113 or workpieces could be prepared to be attached to the hollow cylinder 303 and thus rapidly changed. It is contemplated that the attachment device 311 could have a magnet 319 or another quick-change device secured to a gripping device 317 such as a rubber puck or the like.

Referring now to FIGS. 4A and 4B the embodiment 301 of the shaft is depicted in use. The hollow cylinder is placed on the shaft 109 so that the shaft 109 enters the passageway 307 at the second end 309 as depicted by motion B. The hollow cylinder advances until the magnet 319 held by the gripping device 317 contacts the end 401 of the shaft 109 so that the force exerted by the magnet holds the embodiment 301 thereon.

It should be appreciated that one of the unique features believed characteristic of the present application is that the turning head 103 is able to pivot about axis 107 to allow a person working therewith to lower the chances of injury through accidental contact with the workpiece.

Figure 5:
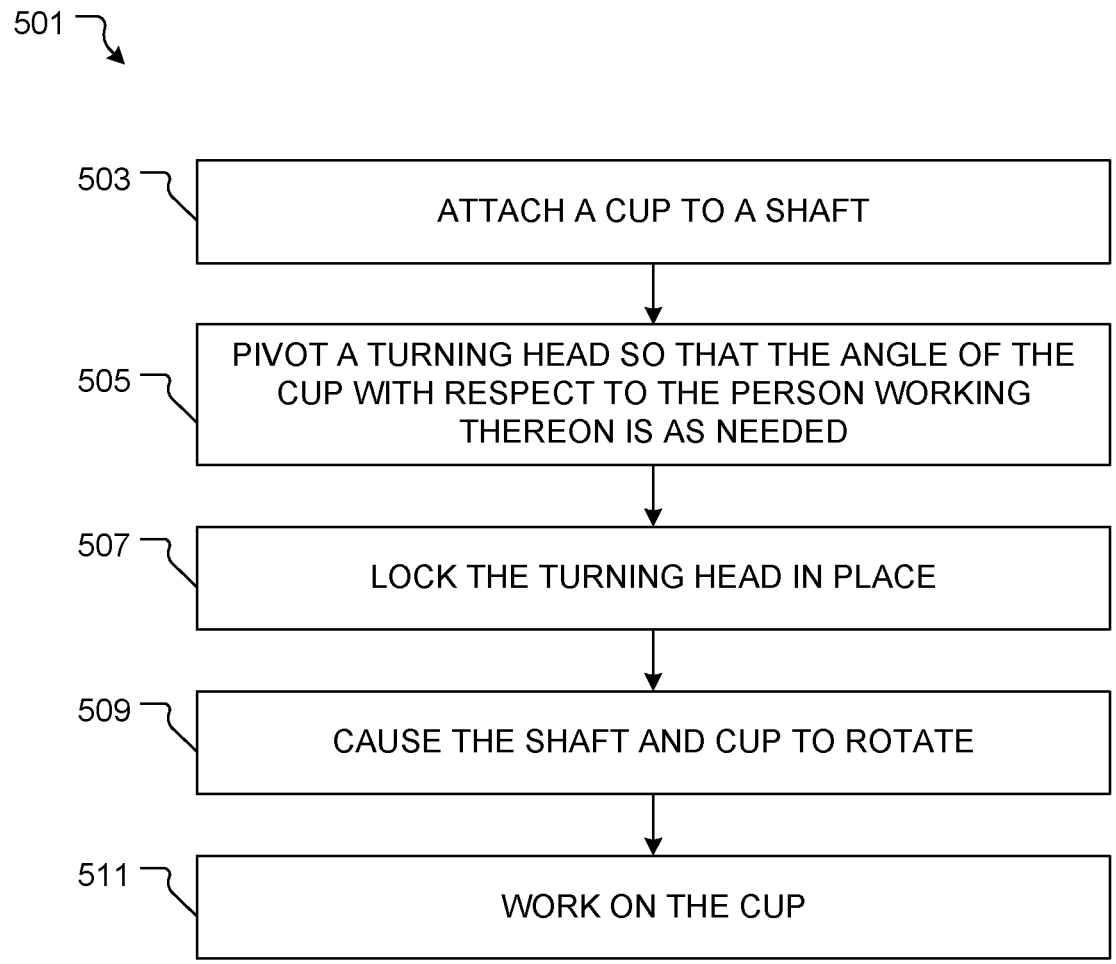
FIG. 5 is a flowchart of a method of working with a rotating workpiece.

Referring now to FIG. 5 a method of working with a rotating workpiece is depicted. Method 501 includes attaching a cup to a shaft 503, pivoting a turning head so that the angle of the cup with respect to the person working thereon is as needed 505, locking the turning head in place 507, causing the shaft and cup to rotate 509 and working on the cup 511.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A turning system consisting of:
    a rectangular pivotable turning head having a front surface that extends from a first end to a second end, the turning head is attached to a rectangular first support at the first end and a rectangular second support at the second end, the turning head rotates about an axis between the first support and the second support;
    a rotary shaft extending from the front surface of the turning head, a rotation axis of the rotary shaft being perpendicular to the axis between the first support and the second support;
    a base plate attached to the first support and the second supporter longitudinal length of each the first support and the second support extending perpendicular to the base plate, and the base plate extending underneath the shaft; and
    a hollow cylinder extending from a first open end to a second open end, the hollow cylinder having:
        an interior cylindrical through-hole extending from the first open end to the second open end, the interior cylindrical through-hole having an inner cylindrical wall;
        a gripping device secured within the interior cylindrical through-hole directly contacting the inner cylindrical wall; and
        a magnet secured to the gripping device, the magnet spaced apart from the inner cylindrical wall such that there is not direct contact between the magnet and the inner cylindrical wall;
    wherein the hollow cylinder is sleeved over the rotary shaft and the magnet is releasably engaged with an end of the rotary shaft within the interior cylindrical through hole.

* * * * *